Sept. 20, 1971     H. GANSER ET AL     3,606,499
ANTIFRICTION BEARING ASSEMBLY HAVING AN ORBITING
ROLLER ARRANGEMENT
Filed Nov. 25, 1969
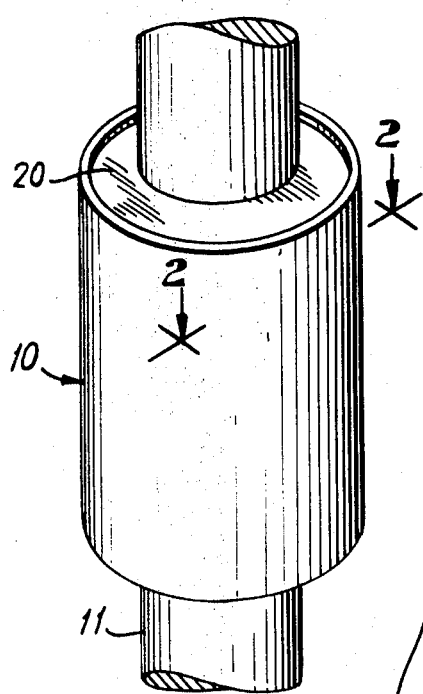
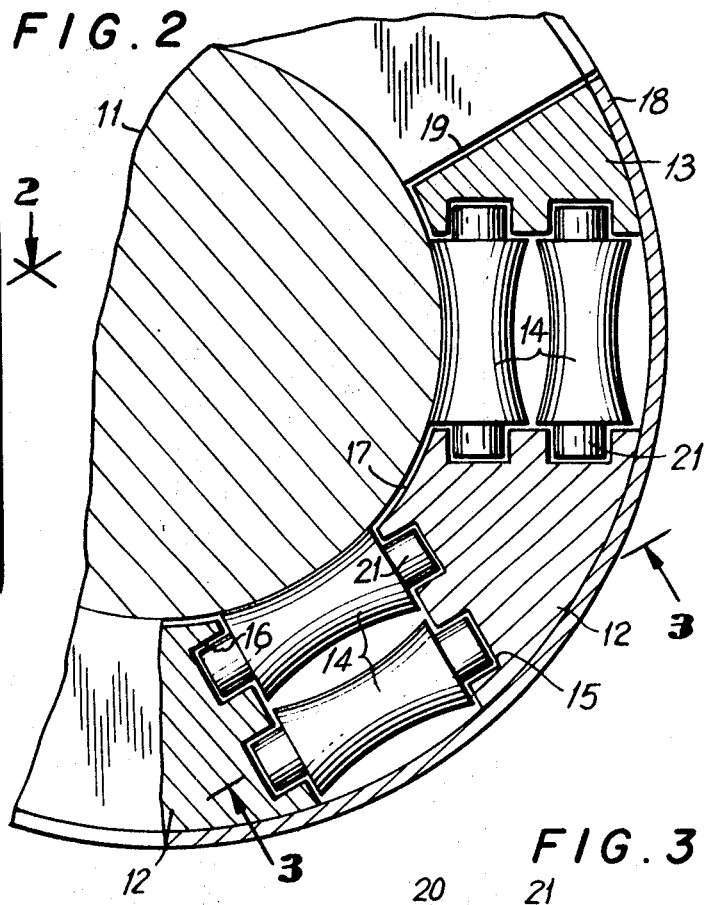
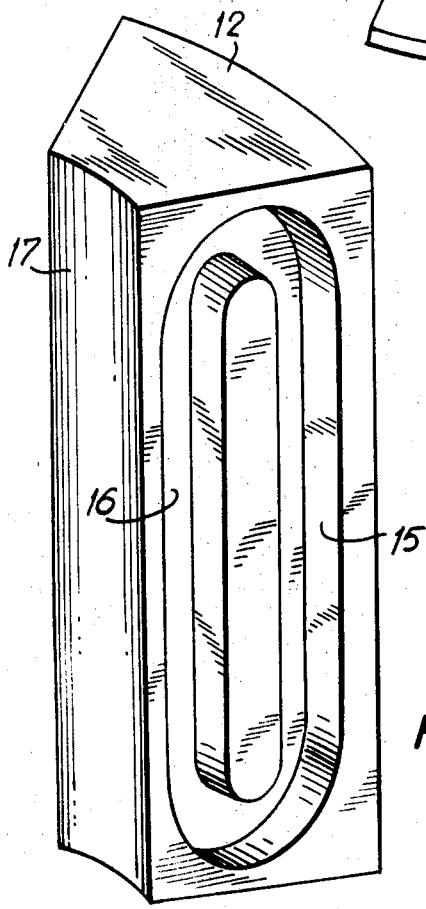
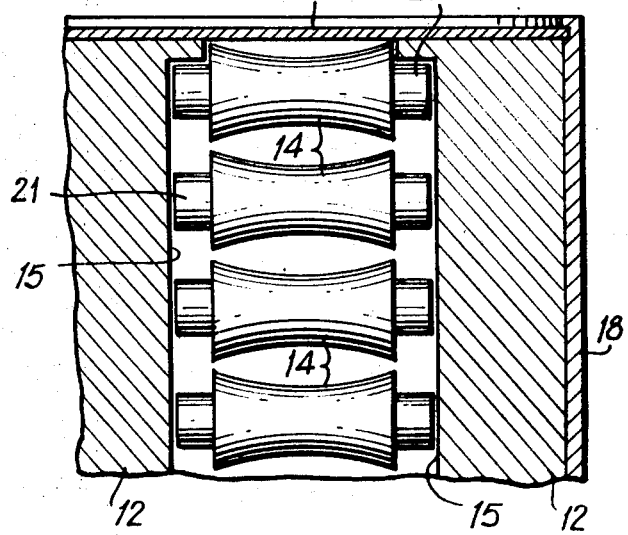
INVENTORS.
HERMAN GANSER
ALFRED GANSER
BY
ATTORNEY

United States Patent Office 3,606,499
Patented Sept. 20, 1971

3,606,499
ANTIFRICTION BEARING ASSEMBLY HAVING AN ORBITING ROLLER ARRANGEMENT
Herman Ganser, 116—19 219th St., Cambria Heights, N.Y. 11411, and Alfred Ganser, 86—9 208th St., Apt. 2F, Queens Village, N.Y. 11427
Filed Nov. 25, 1969, Ser. No. 879,712
Int. Cl. F16c 29/00
U.S. Cl. 308—6C                                    6 Claims

ABSTRACT OF THE DISCLOSURE

An antifriction linear bearing assembly for receiving a cylindrical guide pin or post consisting of a plurality of spaced-apart segments having endless raceways for receiving a plurality of concave roller bearings which recirculate or orbit within the raceways in response to the movement of the bearing assembly or guide pin.

---

This invention relates to linear motion roller bearing assembly.

More specifically, this invention relates to a linear motion roller bearing assembly which provides a plurality of recirculating or orbiting roller bearings for linear moving members.

Conventional devices utilizing linear motion roller bearings have generally employed a plurality of ball bearings which make multiple point contact on a linear moving member. Improved linear motion bearings include a plurality of ball bearing races which permit the ball bearings to recirculate along an elongated endless path during the motion of the shaft. These bearings however, suffer from the disadvantage in that for heavy loads, the ball bearings tend to wear out permaturely due to their point contact with the linear moving member. Moreover, the ball bearings tend to score the surface of the member after repeated use under heavy load conditions.

Accordingly, the present invention provides a linear motion bearing assembly which includes a plurality of roller bearings pivotably mounted within the bearing housing for recirculation during the linear motion of a heavily loaded member. The roller bearings contained in the bearing assembly provide a plurality of linear contacts on the circumference of the member. Because of the increased surface contact of these linear paths produced by the roller bearings, it is possible to increase the load applied to the member moving through the bearing assembly without substantially increasing its dimensions. In another embodiment of the invention, the linear motion bearing assembly includes an open slot so that it has an adjustable diameter to provide zero clearance for the reciprocating members inches guide pins. The result of this improved linear bearing assembly is that the reciprocating shafts traverse the bearing with low friction and wear, and provide a lasting precision alignment so as to eliminate binding and shatter, and substantially reduce maintenance.

It is therefore an object according to the present invention to provide a linear motion bearing assembly which includes a plurality of recirculating roller bearings for heavy duty purposes.

It is a further object according to the present invention to provide a linear motion bearing assembly having a plurality of recirculating roller bearings capable of providing linear contact to a linearly traveling shaft under heavy load conditions.

It is still a further object according to the present invention to provide a linear motion roller bearing assembly which is simple in design, easy to manufacture, and reliable in operation.

Other objects and features of the present invention will become apparent from the following detailed description considered in connection with the accompanying drawings which discloses the embodiments of the invention. It is to be understood, however, that the drawing is designed for the purpose of illustration only and not as a definition of the limits of the invention.

In the drawing, wherein similar reference characters denote similar elements throughout the several views:

FIG. 1 is a perspective view of the linear bearing assembly according to the invention;

FIG. 2 is a cross-sectional view taken along line 2—2 of FIG. 1;

FIG. 3 is a cross-sectional view taken along line 3—3 of FIG. 2; and

FIG. 4 is a perspective view in detail of one of the plurality of bearing segments disposed within the assembly of FIG. 1.

Referring to FIGS. 1-4, there is shown a linear bearing assembly or casing 10 consisting of a tubular antifriction roller bearing having a guide pin or post 11 extending axially through its center passage or bore. Bearing assembly 10 is designed to permit reciprocating motion of guide pin or post 11 through its center passageway. Contained within its outer shell 18, assembly 10 includes a plurality of bearing segments 12 which in this embodiment, have a triangular cross-section and include an elongated, endless groove or raceway 15 and 16 formed on each of its converging sides. Apex portion 17 of segment 12 is cylindrically formed and recessed slightly in dimension so as not to interfere with the surface of guide pin or post 11. The outer surfaces of segments 12 are also cylindrically shaped to mount within tubular shell 18 of assembly 10. Bearing segments 12 are mounted in spaced apart relationship within tubular shell 18 so that endless raceways 15 and 16 will be parallel with respect to each other in order to serve as trunnions for shafts 21 of concave roller bearings 14. The end flanges of concave roller bearings 14 are formed at right angles with respect to shafts 21 in order to maintain the spacing between consecutive bearings segments 12.

The linear bearing assembly according to the invention is assembled by inserting pluralities of roller bearings 14 between each of the segments 12 held in a cylindrical configuration, and sliding these segments to fit within tubular shell 18. The number of roller bearings 14 inserted between each set of raceways is not critical.

It is, however, desirable to include as many roller bearings as possible in the raceway, such as shown in FIG. 3, in order to increase the load bearing capacity of the bearing assembly. The bearings which are traveling along the upper portion 16 of the raceways make rolling contact with the cylindrical surface of guide pin or post 11. The bearing surface of roller bearing 14 in this embodiment is preferably constructed with a cylindrical concave surface which corresponds in radius to the radius of guide pin or post 11. During the reciprocating motion of guide pin or post 11, through bearing assembly 10, roller bearings 14 also travel in the direction of motion of pin 11 so as to recirculate or orbit through endless raceways 15 and 16.

In another embodiment of the invention, one of the bearing segments 12 may be split into two sections 13 to form an open ended or zero tolerance bearing assembly. Shell 18 will also include a corresponding slit of a few thousandths of an inch so that after the assembly is inserted over guide pin 11, it may be clamped closed by a suitable clamp assembly (not shown) in order to eliminate any clearance between the contact surfaces of bearings 14 and the cylindrical surface of pin 11. It is anticipated that most of the bearing assemblies will be constructed without the use of slot 19 where very close tolerances between bearings 14 and pin 11 is not required. However, it is a simple procedure during the manufacture of the bearing assembly to split one of the segments 12, and shell 18, in order to form an open ended, zero clearance bearing.

At each end of shell 18, will be provided an end plate 20 mounted within or frictionally retained at the edge of shell 18. End plate will, of course, include a circular opening through its center portion of sufficient clearance to permit guide pin 11 to pass freely therethrough.

The bearing assembly according to the invention overcomes many of the disadvantages of linear ball bearing devices in providing arcuate contact to the surface of guide pin 11, rather than a plurality of point contacts, in order to increase the load bearing surface of the bearing assembly. It is therefore possible to substantially increase the load applied to guide pin 11, without increasing the size of the bearing assembly by the use of the recirculating roller bearings of the invention.

Bearing assembly 10, which consists of tubular shell 18, circular end plates 20, segments 12 (and 13), and concave roller bearings 14 may be constructed from any rigid materials such as metal, plastic and the like. Shafts 21 are preferably integrally formed with respect to bearings 14 for simplicity in construction. However, it is possible that shafts 21 may be inserted through cylindrical bores in bearing portion 14 so as to provide pivotable support therefor. The width of raceways 15 and 16 will be sufficient to permit shaft 21 to slideably recirculate therethrough. Bearing assembly 10 will be suitably lubricated by oil or grease in order to aid the anti-friction bearing movement before end plates 20 are mounted.

While the subject invention has been illustrated for use with a cylindrical guide pin or post, it is obvious that segments 12 may be flattened or become corner posts within a rectangularly shaped, or hexagonally shaped bearing assembly, for the purposes of providing an antifriction bearing for a guide pin having a rectangular, hexagonal, or polygonal cross-section. In this case, roller bearings 14 would not include concave bearing surfaces, but would have cylindrical surfaces for rolling contact with the flat surfaces of the polygonally shaped shaft.

While only a few embodiments of the present invention have been shown and described, it will be understood that many changes and modifications may be made thereunto without departing from the spirit and scope of the invention.

What is claimed is:

1. An antifriction bearing assembly for an axially moving member comprising;

outer tubular sleeve means,
a plurality of bearing segments spaced apart within said sleeve means and including endless bearing receiving raceways disposed in opposing adjacent radial faces of said segments, and
roller bearing means having shafts slidably engaged in said raceways and supported between said segments for engagement with said axially moving member.

2. The antifriction bearing assembly as recited in claim 1 wherein said tubular sleeve means is cylindrically shaped to receive said segments, said segments being cylindrically shaped, and said bearing means comprising a plurality of cylindrically concave bearings.

3. The bearing assembly as recited in claim 2 wherein said tubular sleeve means additionally comprises end plates having central openings for receiving said axial member.

4. The bearing assembly as recited in claim 1 wherein said bearing segments additionally comprises at least one split segment, and said tubular sleeve means also includes at least one split section corresponding to said split segment to permit zero clearance between said assembly and said axial member.

5. The bearing assembly as recited in claim 2 wherein said axially movable member comprises a cylindrical guide pin.

6. The bearing assembly as recited in claim 5, wherein said bearing segments additionally comprise at least one split segment, and said tubular sleeve means also includes at least one split section corresponding to said split segment to permit zero clearance between said assembly and said axial member.

References Cited

UNITED STATES PATENTS

| 2,979,147 | 4/1961 | Naumann | 308—6CX |
|---|---|---|---|
| 2,981,570 | 4/1961 | White | 308—6C |
| 3,248,900 | 5/1966 | Shurts | 308—6CX |
| 2,451,359 | 10/1948 | Schlicksupp | 308—6 |
| 2,682,435 | 6/1954 | Rien et al. | 308—216 |
| 3,469,893 | 9/1969 | Hudson | 308—6 |

FOREIGN PATENTS

| 1,346,506 | 11/1963 | France | 308—6C |

MARTIN P. SCHWADRON, Primary Examiner

B. GROSSMAN, Assistant Examiner